July 2, 1929.  A. L. LIGON  1,719,664

COUPLING CONNECTION FOR PUMP RODS

Original Filed June 28, 1924

WITNESSES
W. A. Williams

INVENTOR
A. L. Ligon.
BY
ATTORNEYS

Patented July 2, 1929.

1,719,664

UNITED STATES PATENT OFFICE.

ARTHUR LEE LIGON, OF FORT STOCKTON, TEXAS.

COUPLING CONNECTION FOR PUMP RODS.

Original application filed June 28, 1924, Serial No. 722,996. Divided and this application filed March 16, 1925. Serial No. 15,994.

My invention relates to improvements in coupling connections for pump rods, and it consists in the combinations, constructions and arrangements herein described and claimed.

The present application is a division of my pending application Serial No. 722,996 filed June 28, 1924, for Coupling connection for pump rods.

An object of the invention is the provision of simple, reliable and quickly and easily adjustable means for connecting the upper end portion of a pump or sucker rod releasably to the vertically reciprocating part of a pumping jack.

A further object of the invention is the provision of a coupling connection of the character described which comprises elements engaged adjustably with each other so that the effective length of the pump rod can be varied.

Figure 1:
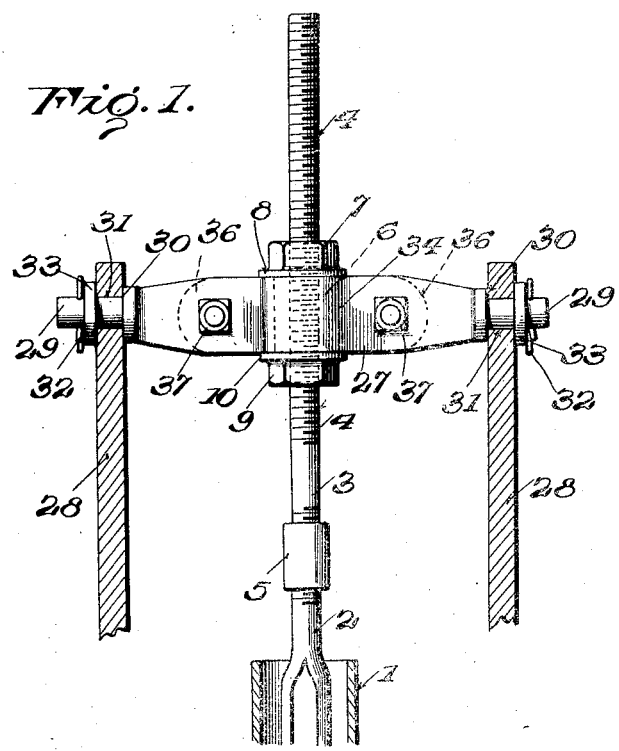
Figure 2:
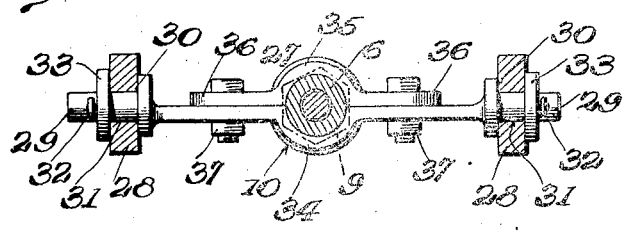

Other objects and advantages of the invention will be apparent from the following description, considered in conjunction with the accompanying drawings, in which Figure 1 is a fragmentary view, partly in vertical section and partly in side elevation, showing a coupling connection embodying the invention in position to connect a pump rod with a pumping jack, and Figure 2 is a plan sectional view of the structure exhibited in Figure 1.

In the drawings, the numeral 1 designates the upper end portion of a well casing. The upper end portion 2 of a pump or sucker rod which is vertically reciprocable in the well casing is connected by a union 5 to a rod 3. The upper end portion of the rod 3 is provided with screw threads as indicated at 4. The rod 3 is held rigid with the pump or sucker rod by means of the union 5 and may be considered an extension to the pump or sucker rod.

A thimble 6 surrounds the rod 3 and is joined integrally or othewise at its upper end to a flanged adjusting nut 7 which is in engagement with the threads 4. The flange on the nut 7 is indicated at 8 and is at the lower end of the nut and therefore at the upper end of the thimble. A jam nut 9 in engagement with the threads 4 of the rod 3 below the thimble 6 has a flange 10 at its upper end which will abut the lower end of the thimble when the nut 9 has been turned on the rod 3 against the thimble. Obviously, the flanges 8 and 10 may be washers separate from the nuts with which they are associated.

A cross head 27 is carried at the upper end of a pair of pitmans 28. The cross head 27 includes an elongated body having axially aligned reduced portions 29 at its opposite ends. Shoulders as indicated at 30 thus are provided at the inner ends of the reduced portions 29. The reduced end portions 29 are circular in cross sectional contour and constitute journal pins which are adapted to extend through openings 31 in the upper end portions of the pitmans 28. The pitmans are retained on the reduced end portions 29 by the shoulders 30 and by washers 33 which are held against the outer faces of the upper end portions of the pitmans 28 by cotter pins 32 or like fastening devices. The intermediate portion of the body of the cross head is bent laterally along the arc of a circle to provide a section 34 of a clamp. A cap for cooperating with the body of the cross head has an intermediate portion bent laterally along the arc of a circle to provide a clamping section 35 which is complemental to the section 34 and is adapted to cooperate with the latter to embrace the thimble 6. The cap 35 also includes attaching ends 36 which may be detachably secured to the body of the cross head by suitable fastening devices, such as the bolts and nuts indicated at 37. The cross head 27 thus is adapted to be secured to the thimble 6 between the nuts 9 and 7. Vertical reciprocation of the cross head then will cause vertical reciprocation of the pump or sucker rod 2. The thimble 6 is adjustable on the rod 3 and therefore the effective length of the sucker rod can be varied within limits. The work of connecting the rod 3 with the driving mechanism of the pump jack, which includes the pitmans 28, therefore can be accomplished by the workman quickly and easily without the use of any special tools.

Obviously, the invention is susceptible of embodiment in forms other than that illustrated in the accompanying drawings and I therefore consider as my own all such modifications and adaptations of the form of the device herein illustrated and described as fairly fall within the scope of the appended claim.

I claim:—

In a coupling connection of the character described, a pump rod threaded at its upper end, a thimble having a smooth bore and slidable on said pump rod, and a separable cross-head embracing said thimble, retaining nuts mounted on the threaded portion of said rod above and below said thimble, and flange elements of greater diameter than said thimble and abutting the same at its upper and lower ends, and maintained in position by said nuts, and means at the outer ends of the cross head for connection with pitmans.

ARTHUR LEE LIGON.